US011739738B2

(12) United States Patent
Fritz

(10) Patent No.: US 11,739,738 B2
(45) Date of Patent: Aug. 29, 2023

(54) ENERGY CONVERSION METHOD AND APPARATUS USING GRAVITY ASSIST

(71) Applicant: Christopher John Fritz, Reno, NV (US)

(72) Inventor: Christopher John Fritz, Reno, NV (US)

( * ) Notice: Subject to any disclaimer, the term of this patent is extended or adjusted under 35 U.S.C. 154(b) by 0 days.

(21) Appl. No.: 17/873,098

(22) Filed: Jul. 25, 2022

(65) Prior Publication Data

US 2023/0026307 A1  Jan. 26, 2023

Related U.S. Application Data

(60) Provisional application No. 63/203,659, filed on Jul. 27, 2021, provisional application No. 63/225,360, filed on Jul. 23, 2021.

(51) Int. Cl.
*F03G 7/10* (2006.01)
*B64G 1/34* (2006.01)
*B64G 1/24* (2006.01)

(52) U.S. Cl.
CPC .......... *F03G 7/104* (2021.08); *B64G 1/34* (2013.01); *F03G 7/115* (2021.08); *B64G 1/242* (2013.01)

(58) Field of Classification Search
CPC ...... F03G 7/10–119; B64G 1/242; B64G 1/34
See application file for complete search history.

(56) References Cited

U.S. PATENT DOCUMENTS

| 4,795,113 | A | * | 1/1989 | Minovitch | ............... | B64G 1/14 104/282 |
| 5,158,249 | A | * | 10/1992 | Uphoff | .................. | B64G 1/007 244/158.6 |
| 10,156,222 | B2 | * | 12/2018 | Westmoreland | ...... | F03B 17/005 |
| 2006/0042244 | A1 | * | 3/2006 | Villalobos | ................. | F03G 7/10 60/495 |
| 2006/0218892 | A1 | * | 10/2006 | Calvert | ..................... | F03G 7/08 60/268 |
| 2006/0249955 | A1 | * | 11/2006 | Stanciu | ..................... | F03G 7/08 290/1 R |

FOREIGN PATENT DOCUMENTS

WO   WO-2009049636 A1 * 4/2009 ............... F03G 7/08

OTHER PUBLICATIONS

Arne Bergstrom, "Gravity-assist engine for space propulsion", Acta Astronautica, vol. 99, 2014, pp. 99-110, ISSN 0094-5765 Accessible on https://doi.org/10.1016/j.actaastro.2014.02.017. (Year: 2014).*

* cited by examiner

*Primary Examiner* — Laert Dounis
(74) *Attorney, Agent, or Firm* — Plager Schack LLP; Mark H. Plager; Michael J. O'Brien

(57) ABSTRACT

An energy conversion method transfers energy from celestial bodies, including the Earth, to a vehicle apparatus by way of a gravity assist, a descent towards the surface of the celestial body, or both. The energy transferred to the vehicle apparatus may be utilized by: a kinetic energy converter apparatus converting the kinetic energy to any form of kinetic energy, potential energy, or both; doing work on any end use process or power plant apparatus immediately, later, or both; storing the kinetic energy, the potential energy, or both on an accumulator apparatus to be utilized on site, at another location, or both.

10 Claims, 2 Drawing Sheets

ENERGY CONVERSION METHOD AND APPARATUS USING GRAVITY ASSIST

RELATED APPLICATION

This application claims priority to provisional patent application U.S. Ser. No. 63/225,360 ("the '360 application") filed on Jul. 23, 2021.

This application claims priority to provisional patent application U.S. Ser. No. 63/203,659 ("the '659 application") filed on Jul. 27, 2021.

The entire contents of the '360 application is herein incorporated by reference.

BACKGROUND

The embodiments herein relate generally to methods of utilizing the kinetic energy of celestial bodies as a resource for energy use and storage.

Prior to embodiments of the disclosed invention, the novelty of utilizing the kinetic energy of celestial bodies as a resource for work on power plants was unfounded. Embodiments of the disclosed invention solve this problem.

SUMMARY

An energy conversion method transfers energy from celestial bodies, including the Earth, to a vehicle apparatus by way of a gravity assist, a descent towards the surface of the celestial body, or both. The energy transferred to the vehicle apparatus may be utilized by: a kinetic energy converter apparatus converting the kinetic energy to any form of kinetic energy, potential energy, or both; doing work on any end use process or power plant apparatus immediately, later, or both; storing the kinetic energy, the potential energy, or both on an accumulator apparatus to be utilized on site, at another location, or both.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
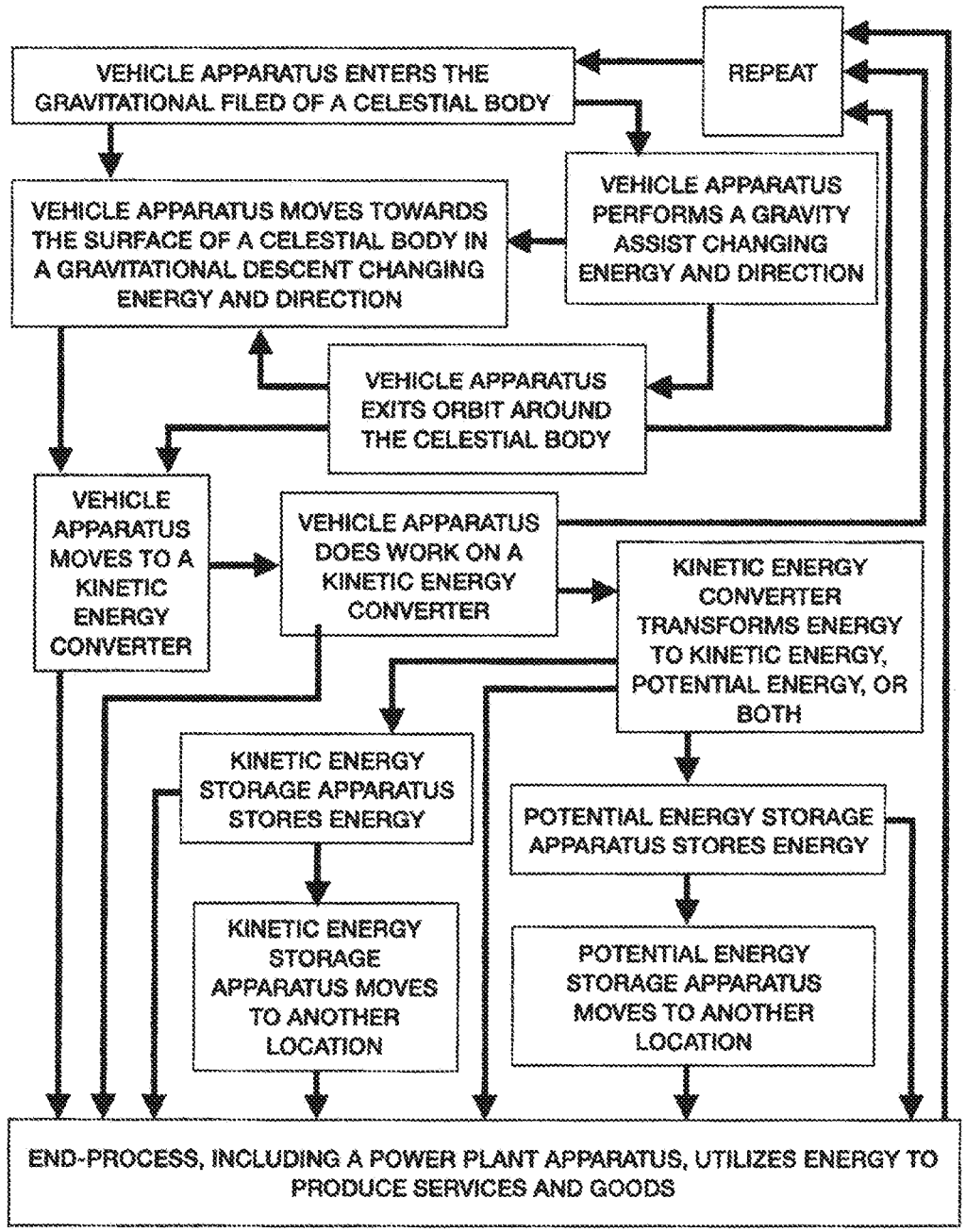
FIG. 1 shows a flow chart of one embodiment of the present invention.
Figure 2:
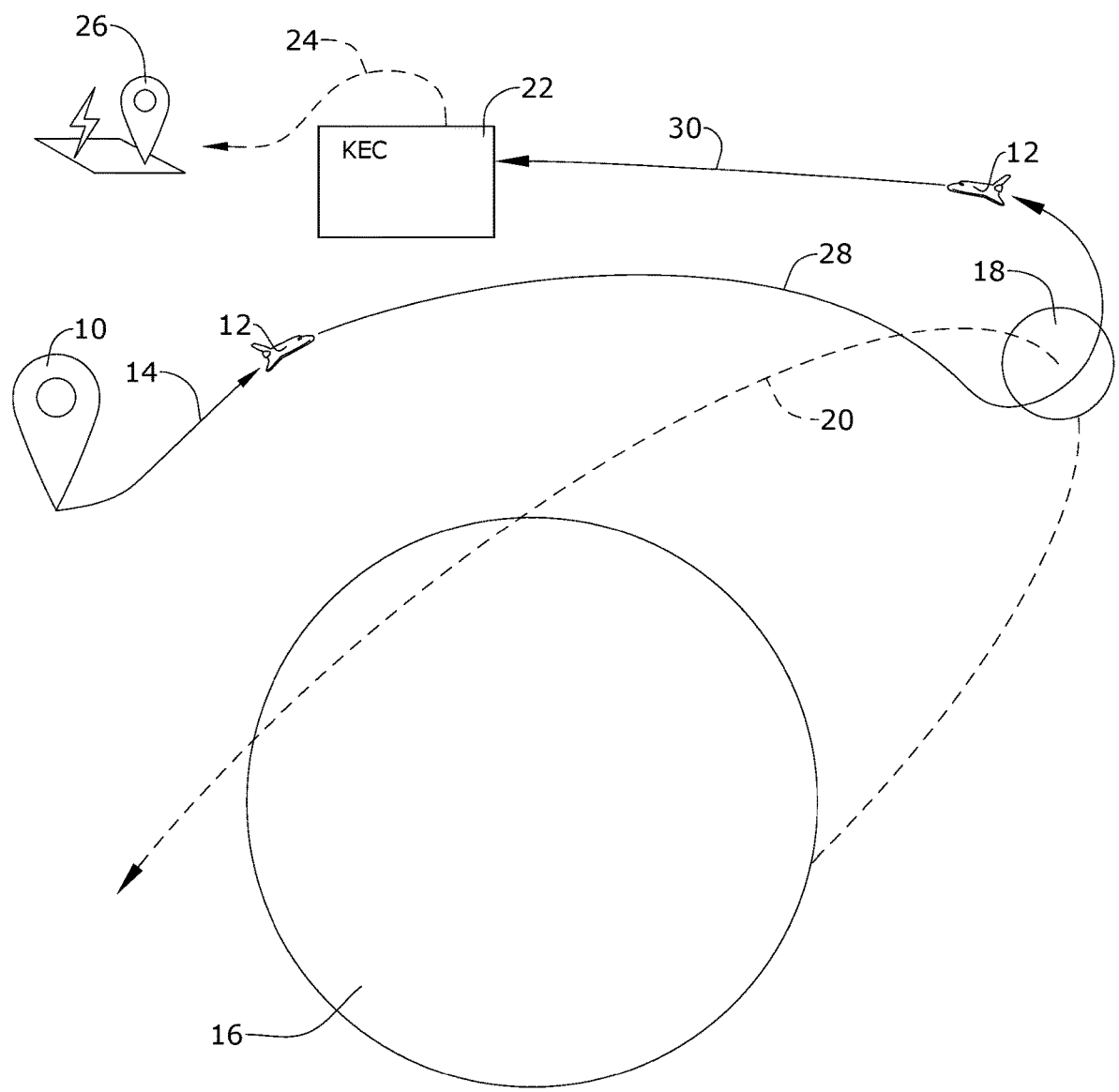
FIG. 2 shows a schematic of one embodiment of the present invention.

The vehicle apparatus (12) includes: an interstellar object, a projectile, a spacecraft, an aircraft, a cargo container, a satellite or any combination thereof.

A gravity assist (28), also known as a gravity slingshot, is a method of trajectory in orbital mechanics utilizing the movement and gravitational force of an orbiting celestial body moving in orbit around a central celestial body to change a vehicle apparatus's: direction of movement, position in space, and its energy.

In a gravity assist trajectory a vehicle apparatus is launched (10) from the central celestial body (16) or is already in orbit around the central celestial body. The vehicle apparatus actuates an orbital transfer trajectory (14) escaping from the central celestial body. The vehicle apparatus actuates an orbital approach trajectory entering into an orbit around the orbiting celestial body (18). The vehicle apparatus orbits the orbiting celestial body. The vehicle apparatus actuates an orbital departure trajectory (30) exiting orbit around the orbiting celestial body at a wanted bearing. As an example, the Moon is an orbiting body in orbit (20) reference to the Earth as a central celestial body.

The change in speed, energy of the vehicle apparatus results from the gravitational force of an orbiting celestial body pulling the vehicle apparatus into the movement of the celestial body. The change in energy and direction of movement of the vehicle apparatus results in an efficient use of fuel.

A gravity assist trajectory can also increase the potential energy of a vehicle apparatus: the vehicle apparatus actuates an insertion orbit around an orbiting celestial body at the periapsis and actuates a departure orbit trajectory at the apoapsis and actuates an orbital transfer trajectory to an orbit around the central celestial body. The vehicle apparatus increases its gravitational potential energy in reference to the central celestial body as a result of the kinetic energy of the orbiting celestial body combined with the orbital trajectory of the orbiting celestial body.

The prior art of gravity assists can utilize the change in a primary energy being kinetic energy, potential energy, or both and the direction of movement to do work on an end-use process, including a power plant apparatus (26), resulting in the production of goods and services including electricity. The primary energy is transformed by a kinetic energy converter to a secondary energy.

Force is commonly paraphrased as push or pull. Force is an influence resulting in the modification of an object's movement. Force is a vector quality thus it has both magnitude and direction.

Paraphrasing Newton's third law of motion for every action there is an equal and opposite reaction. From this logic, when a vehicle apparatus actuates a gravity assist trajectory, the energy of the celestial body changes by the same magnitude of change in energy of the vehicle apparatus.

Work is the sum of all force applied to an object or system from a starting point to an end point. Work is a scalar quality, thus it has magnitude but no direction. Work is a universal way to explain the amount of effort needed to complete a task involving different forms of effort and the different directions and distances the forms were applied to an object or system.

Energy is the change in work on a body or system measured in Joules. Energy is a conserved quantity, and can't be created or destroyed, yet transferred from one body or system to another.

Kinetic energy is the energy an object possesses due to the motion of said object. Kinetic energy is a scalar quality. Potential energy is the energy an object possesses due to its position.

Non-conservative force is when a force dissipates as heat, sound, or light instead of being transferred completely to the object in which the force is acting upon. Conservative force is transferred completely. The change in kinetic energy is equal to the sum of the non-conservative force and the conservative force.

The change in kinetic energy is the sum of conservative work and non-conservative work.

The work energy theorem can be expressed as the sum of the final kinetic energy plus the final potential energy minus the initial kinetic energy plus the initial potential energy.

Work is measured in Joules. Power is the amount of work in a given time, or the rate at which energy is transferred.

Power is measured in watts. One Joule is equal to 0.0002777778 watt hours or 0.0000002777 kWh.

Velocity is an object's speed and direction of movement. Momentum is an object's mass, speed, and direction. Inertia is an object's ability to resist change to velocity. Elastic collisions conserve both momentum and kinetic energy. Inelastic collisions conserve momentum but decrease kinetic energy. In perfectly inelastic collisions one object sticks to the other. Torque is an amount of force on an object or system rotating about an axis. Moment of inertia is an object's ability to resist change to velocity rotating about a fixed axis.

The fundamental forces of nature are reduced to a weak nuclear force, a strong nuclear force, an electromagnetic force, and a gravitational force. Gravitational force can act upon an object or system from a significant distance, thus are described as non-contact forces. Moreover, gravitational force is often interchangeably referred to as fields, such as a gravitational field. The gravitational force between two objects is equal to multiplying their mass together then dividing by their distance between the centers of their mass and then multiplied by the constant of universal gravitation which is equivalent to six point six seven two times ten to the negative eleventh power. Gravitational force is an attractive force only.

The first cosmic velocity is the minimum speed to maintain a vehicle apparatus in orbit around a celestial body at a specific altitude from the celestial body. The second cosmic velocity in the maximum speed a vehicle apparatus in orbit around a celestial body can obtain at a specific altitude before the vehicle apparatus will escape orbit from the celestial body. The second cosmic velocity is also known as the escape velocity. The difference in the first and second cosmic velocity may be repeatedly utilized by a vehicle apparatus to do work on a power plant apparatus to produce goods and services.

Mass of the Moon is 7.346 times $10^{22}$ kg. The velocity of the Moon ranges from 0.970 km/s and 1.082 km/s. The distance of the Moon from the Earth ranges from apogee, also known as apoapsis, at 406,700 km to perigee, also known as periapsis, at 356,500 km; a difference of about 50,000 km. The diameter of the Earth is 6371 km and the diameter of the Moon is 1738 km.

Kinetic energy in joules is ½ multiplied by the mass in kilograms multiplied by the velocity in meters per second squared. Gravitational potential energy is mass in kilograms multiplied by the gravity in meters per second squared multiplied by the altitude from the surface in meters.

The change in speed of the vehicle apparatus in a gravity assist trajectory can be computed by the math formula Velocity final=$\sqrt{[}$(Orbital Velocity of the celestial body+cos (θ) multiplied by the vehicle apparatus velocity)^2)+((sin(θ) multiplied by the vehicle apparatus velocity)^2)]. θ is the angle between the direction the orbiting celestial body is moving and direction the vehicle apparatus is, or will be, moving after actuating a departure trajectory.

The best use gravity assist and gravitational descent is when the vehicle apparatus is orbiting the Earth retrograde and approaches the Moon in perigee and actuates an orbital insertion to the Moon in a prograde rotation in the same plane as the lunar orbital plane. The vehicle apparatus enters at an altitude to the Earth's center of mass of 355,864 km and an altitude of 399 km above the surface of the Moon at a speed of nearly 1.0598 km/s. When the vehicle apparatus orbits around the Moon by 180 degrees after the orbital insertion and is nearly above the surface point farthest away from the Earth the vehicle apparatus will reach a speed nearly matching the orbital escape velocity for the 399 km altitude of the Moon at 2.1415 km/s. The vehicle apparatus will continue to maintain orbit around the Moon until the Moon orbits around the Earth and reaches the apogee position. The vehicle apparatus will thrust when at the position in between the Moon and Earth being closest to the surface of the Earth and actuate an escape trajectory from the orbit of the Moon and enter into an orbit around the Earth retrograde. The gravitational force of the Moon will slow down the vehicle apparatus by 0.97 km/s to 1.1715 km/s. At least one kinetic energy converter (24) operatively connected to a power plant apparatus in the same orbital plane will rendezvous with the vehicle apparatus. The vehicle apparatus will do work on the power plant apparatus. A cumulation of numerous rendezvous between the vehicle apparatus and numerous power plant apparatuses will utilize 0.1117 km/s of speed of the vehicle apparatus. The distance from the Moon to the Earth changes by 50,000 km from the perigee to the apogee. The vehicle apparatus will also convert the gravitational potential energy, from the change in distance from the perigee to the apogee, to kinetic energy by gradually actuating a gravitational descent towards the surface of the Earth until reaching an altitude of 355,864 km and repeating the method.

The kinetic energy of a 550,000 kg vehicle apparatus at 0.1117 km/s is 3,431,144,750 joules and when converted to kilowatt hours, it equals 953 kWh. The gravitational potential energy of a vehicle apparatus with a mass of 550,000 kg and a distance towards the center of mass of the Earth of 50,000 km is 550,000 kg*9.8 m/s^2*50,000 m=269,500,000,000 joules and when converted to kilowatt hours, it equals 74,840 kWh. The Net Work from the kinetic energy utilized from the vehicle apparatus and the gravitational potential energy utilized from the vehicle apparatus is 75,793 kWh.

The kinetic energy of celestial bodies as a resource is plentiful. The kinetic energy of the Moon alone is estimated at 38 octillion joules. The best use trajectory can be repeated an estimated 11 quintillion times for a total production of 839 sextillion kWh at 100 percent efficiency; however, the Moon's velocity would decrease to zero.

The power plants can be stationary or moving in orbit. The stationary power plants require a gravitational descent trajectory by the vehicle apparatus to the surface of a celestial body.

A vehicle apparatus works on a power plant apparatus by: contact force, non-contact force, and a combination of both. The lexicon of the power plant apparatus is interchangeable with the kinetic energy converter.

A power plant apparatus moving in orbit has at least one magnet attached to the aft or forward section of the apparatus. The vehicle apparatus has at least one magnet attached to the forward or aft section of the apparatus. The magnets are able to be panned and tilted. The magnets have their poles oriented to repel or attract the power plant apparatus with respect to the vehicle apparatus. The vehicle apparatus will move into proximity of the power plant apparatus causing the vehicle apparatus to do work on the power plant apparatus with a magnetic field non-contact force.

Numerous power plant apparatus can be coupled in tandem, creating a spacecraft train. The vehicle apparatus will do work on the power plant apparatus by pulling or pushing on the power plants. A tether apparatus is deployed to operatively connect the vehicle apparatus to the power plant apparatus.

The vehicle apparatus has magnets attached to its structure. The power plant apparatus has a hollow core. Tightly wrapped around the hollow core are a series of wire coils including copper wire. The vehicle apparatus travels through the hollow section of the power plant apparatus. When the vehicle apparatus moves through the hollow core in a certain amount of time an electromotive force produced by the magnets actuates an electromagnetic induction where the vehicle apparatus works on the power plant apparatus. An electrical potential charges between the terminals of a circuit. An electrical current moves through the copper wire coils resulting from the magnetic induction. The electricity can be utilized for numerous methods of production of goods and services. Alternatively, the vehicle apparatus can have the coil and hollow core and the power plant can have magnets attached to the structure.

The vehicle apparatus interlocks with the power plant apparatus; resulting from the interlocking is a rotary motion, or reciprocating, wherein the motion works on the power plant apparatus.

The vehicle apparatus makes contact with the power plant apparatus dampened by a spring where the vehicle apparatus works on the power plant apparatus by compressing the spring.

The vehicle apparatus moves into a power plant apparatus comprising a receptacle containing matter where the vehicle apparatus operatively connects to the matter producing friction and doing work on the power plant apparatus by increasing the thermal load of the matter as a working medium. The increase in thermal energy of the medium results in a change in pressure, volume, or both of the medium. The change in pressure, volume, or both is utilized by a power plant apparatus to produce goods and services. The medium can include carbon dioxide. The medium can include buffers to stabilize the reactions from the vehicle apparatus operatively connecting to the medium.

Potential energy storage objects, also known as accumulators can include electrochemical batteries, fuel cells, springs, compressed gas, and animals or plants as organic molecules.

Kinetic energy storage object also known as accumulators can include kinetic flywheels, mediums in thermal insulated containers, and electrical current in superconductors.

What is claimed is:

1. An energy conversion method comprising:
    choosing a trajectory of a gravity assist;
    providing a vehicle apparatus moving on said trajectory utilizing a gravity field of a celestial body;
    transferring a primary energy from said celestial body to said vehicle apparatus as a result of said trajectory, resulting in said vehicle apparatus changing a position in space;
    moving said vehicle apparatus towards a kinetic energy converter;
    doing work by said vehicle apparatus on said kinetic energy converter;
    transforming said primary energy of said vehicle apparatus to a secondary energy by said kinetic energy converter;
    storing said secondary energy on an accumulator apparatus or immediately utilizing said secondary energy by a power plant apparatus;
    utilizing said secondary energy on location or transporting said accumulator apparatus to another location;
    producing a good and a service by said power plant apparatus utilizing said secondary energy; and
    repeating any action of said energy conversion method as needed.

2. The energy conversion method of claim 1, wherein said celestial body is the Moon orbiting the Earth.

3. The energy conversion method of claim 1, further comprising planning said trajectory prior to choosing.

4. The energy conversion method of claim 1, further comprising selecting said vehicle apparatus from the group consisting of a spacecraft, a satellite, an interstellar object, and a projectile.

5. The energy conversion method of claim 1, further comprising selecting said accumulator apparatus from the group consisting of an electrochemical battery, a fuel cell, a spring, an organic molecule, a compressed gas within a tank, a kinetic flywheel, a medium in a thermal insulated container, and an electrical current in a superconductor.

6. The energy conversion method of claim 1, wherein providing said kinetic energy converter comprises:
    providing a container;
    filling said container with a medium;
    adjusting the pressure within the container;
    adjusting the temperature within the container;
    moving said vehicle apparatus into said container causing friction between said vehicle apparatus and said medium resulting in the transforming of said primary energy of said vehicle apparatus to said secondary energy of said medium; and
    utilizing said secondary energy of said medium by said power plant apparatus to produce said good and said service.

7. The energy conversion method of claim 6, wherein said medium is carbon dioxide.

8. The energy conversion method of claim 1, further comprising:
    attaching at least one magnet to the forward or aft section of the vehicle apparatus, wherein said kinetic energy converter is operatively connected to said power plant apparatus;
    providing an assembly for said at least one magnet to tilt and pan, wherein said assembly comprises the ability to attach to a spring;
    transforming said primary energy of said vehicle apparatus to said secondary energy of said kinetic energy converter by a non-contact force between said at least one magnet on said vehicle apparatus and said power plant apparatus; and
    doing work on said power plant apparatus operatively connected with said kinetic energy converter to produce said good and said service.

9. The energy conversion method of claim 8, further comprising: operatively connecting at least two kinetic energy converters to said power plant apparatus with at least one tether to assemble a train.

10. The energy conversion method of claim 1, further comprising: attaching at least one magnet to a structure of said vehicle apparatus;
    said kinetic energy converter comprising a hollow core;
    wrapping a series of at least one tightly wrapped coil of wire, operatively connected to an electrical circuit, around said hollow core;
    moving said vehicle apparatus through said hollow core creating an electromagnetic induction and an electrical current; and
    utilizing said electrical current by said power plant apparatus to produce said good and said service.

* * * * *